United States Patent
Zhang

(10) Patent No.: US 7,908,572 B2
(45) Date of Patent: Mar. 15, 2011

(54) CREATING AND APPLYING VARIABLE BIAS RULES IN RULE-BASED OPTICAL PROXIMITY CORRECTION FOR REDUCED COMPLEXITY

(75) Inventor: Youping Zhang, Fremont, CA (US)

(73) Assignee: Takumi Technology Corporation, Santa Clara, CA (US)

( * ) Notice: Subject to any disclaimer, the term of this patent is extended or adjusted under 35 U.S.C. 154(b) by 0 days.

(21) Appl. No.: 11/221,533

(22) Filed: Sep. 8, 2005

(65) Prior Publication Data

US 2006/0085773 A1    Apr. 20, 2006

Related U.S. Application Data

(60) Provisional application No. 60/619,160, filed on Oct. 15, 2004.

(51) Int. Cl.
G06F 17/50 (2006.01)

(52) U.S. Cl. ............... 716/53; 716/51; 716/52; 716/54; 716/55; 716/56; 430/5; 430/30

(58) Field of Classification Search .............. 716/19–21, 716/50–56; 430/5, 30
See application file for complete search history.

(56) References Cited

U.S. PATENT DOCUMENTS

| | | | |
|---|---|---|---|
| 6,523,162 B1 * | 2/2003 | Agrawal et al. | 716/19 |
| 7,024,655 B2 * | 4/2006 | Cobb | 716/19 |
| 7,028,284 B2 * | 4/2006 | Cobb et al. | 716/21 |
| 2003/0061587 A1 * | 3/2003 | Zhang et al. | 716/11 |
| 2003/0163791 A1 * | 8/2003 | Falbo et al. | 716/2 |
| 2003/0208741 A1 * | 11/2003 | Ono | 716/21 |
| 2004/0137343 A1 * | 7/2004 | Eurlings et al. | 430/30 |
| 2004/0168147 A1 * | 8/2004 | Dai et al. | 716/19 |

* cited by examiner

*Primary Examiner* — Thuan Do
*Assistant Examiner* — Nha T Nguyen
(74) *Attorney, Agent, or Firm* — Hall Estill; William C. Milks, III

(57) ABSTRACT

An optical proximity correction (OPC) based integrated circuit design system and method introduce a variable rule in which rules are specified in terms of multiple correction actions that yield acceptable results. This category of rules provides more degrees of freedom in actual application so that the rule-based OPC tool can intelligently select the proper valid rule that minimizes the OPC complexity or meets other objectives.

44 Claims, 10 Drawing Sheets

(a)

(b)     (c)

CREATING AND APPLYING VARIABLE BIAS RULES IN RULE-BASED OPTICAL PROXIMITY CORRECTION FOR REDUCED COMPLEXITY

CROSS-REFERENCE TO RELATED APPLICATION

This application relates to U.S. Provisional Patent Application No. 60/619,160 filed on Oct. 15, 2004 entitled METHOD FOR CREATING AND APPLYING VARIABLE BIAS RULES IN RULE-BASED OPTICAL PROXIMITY CORRECTION FOR REDUCED COMPLEXITY.

BACKGROUND OF THE INVENTION

1. Field of the Invention

The present invention relates generally to a system and method for designing integrated circuits or migrating integrated circuit designs from one technology node to another for fabrication by a semiconductor manufacturing process and, more particularly, to a system and method for providing optical proximity correction for integrated circuit design layouts.

2. Description of the Prior Art

The semiconductor manufacturing industry is continually evolving semiconductor device designs and fabrication processes and developing new processes to produce smaller and smaller geometries of the designs being manufactured. Semiconductor devices constituted by smaller geometries typically consume less power, generate less heat, and operate at higher speeds than those having larger geometries. Moreover, smaller geometries allow silicon chips to contain more circuit elements, and, hence, the integrated circuit (IC) can be more complex, and more copies of the same die can be produced on a single silicon wafer. Currently, a single IC chip may contain over one billion geometries. Consequently, IC designs and semiconductor fabrication processes are extremely complex, since hundreds of processing steps may be involved. Occurrence of a mistake or small error at any of the design or process steps may necessitate redesign or cause lower yield in the final semiconductor product, where yield may be defined as the number of functional devices produced by the process as compared to the theoretical number of devices that could be produced assuming no bad devices.

Improving time-to-market and yield is a critical problem in the semiconductor manufacturing industry and has a direct economic impact on the semiconductor industry. In particular, a reduced time-to-market and higher yield translate into earlier availability and more devices that may be sold by the manufacturer.

IC design layouts consist of a number of geometries in the form of polygons. Polygons are used to construct different features that are composed of portions of or whole polygons that are typically characterized by certain geometric properties such as dimensions. Each feature constitutes one or more shapes that represent one or more edges of a feature. A combination of features adjacent to each other forms a topological configuration that is often referred to as a pattern, or structure. Therefore, the IC layout can also be viewed as constituting a number of repeated patterns, and any number of such patterns constitutes a portion of the IC layout. These patterns of IC layouts are transferred to the silicon wafer predominantly through a process called lithography. In the most commonly used lithographic process referred to as photolithography, a mask or reticle having transparent and opaque regions representing structures in one IC layer is illuminated by a light source. The light emanating from the mask is then focused on a photoresist layer applied to the wafer. Then the wafer is developed to have portions of the resist removed and portions of the wafer etched, forming the geometrical patterns as desired. Typically, for IC designs with large feature dimensions, the patterns on the design are accurately transferred to the mask, and then accurately transferred to the wafer through the lithography process, culminating in a phenomenon commonly referred to as WYSIWYG ("What you see is what you get").

With ever decreasing feature sizes, increasing pattern densities, and difficulty experienced in the advancement of IC manufacturing equipment, manufacturing of modern IC designs has encountered substantial impediments and concomitant yield problems within the near- and sub-wavelength regime, where the feature dimension is at or below the wavelength of the light source. Diffraction-limited imaging in the near- and sub-wavelength regime has caused the classical WYSIWYG paradigm to disappear. With the emergence of near- and sub-wavelength lithography, patterns projected to the wafer through the lithography process are severely distorted. Typical distortions include line edge displacement, which is common for line edge shapes; corner rounding, which is exhibited by corner shapes, and line end shortening, which is experienced with line end shapes, as illustrated in FIG. 1(a).

In view of the widening gap between design and manufacturability in the near- and sub-wavelength regime, the use of optical resolution enhancement techniques (RET) such as optical proximity correction (OPC) is prevalent in many of the design and manufacturing schema to produce feature sizes of 0.18 μm and smaller. Typically, a design tape-out, in the form of, for example, GDSII, is input to the RET implementation, e.g., an OPC data conversion, which generates new GDSII data using the input GDSII design tape-out as a reference.

OPC is a process in which the physical layout from design tape-out is modified to compensate for the pattern distortion caused by optical diffraction, resist development, etch, and other undesirable effects that occur during the lithography process. There are two known approaches to OPC. One is rule-based OPC, in which case correction rules are determined ahead of time, which specify how different geometrical shapes should be modified according to some simple measures associated with the shapes being considered, for example, feature width and spacing. There are predominantly three types of rule-based OPC. One type is hammerhead, that will be applied to line end shapes, as shown in FIG. 1(d), which corrects for line end shortening. Another type is serif, that will be applied to corners, as shown in FIG. 1(e), which corrects for corner rounding. The last type is edge bias, which corrects for line edge displacement, as shown in FIG. 1(f). The bias correction is a more generic form of correction, as more complex corrections can be represented by a collection of individual edge biases. For example, the serif or hammerhead corrections can be viewed as applying individual biases to two or three consecutive edge segments, with corners filled, as illustrated in FIG. 1(g) for the case of a serif. One polygon can contain a multitude of shapes that demand all three types of correction, as demonstrated in the example shown in FIG. 1(b). Rule-based OPC is usually geometry-based, and is simple and fast. However, rule-based OPC is not very accurate, and, hence, is used only for 0.25 μm or larger technology nodes or on non-critical layers of more advanced technology nodes (0.18 μm or smaller), such as metal, or layers that contain only relatively large geometries whose accuracy requirements are more relaxed. Moreover, generation of correction rules is non-systematic and often requires experience, and as the complexity of the geometries increases, the number of rules and possibly complexity of the rules increase as well, which makes them difficult to maintain.

The other OPC approach is model-based OPC. In model-based OPC, a lithography model, which captures the effects of optics and the general layout to the silicon pattern transfer process, is used to simulate the layout patterns and predict the corresponding patterns on the wafer, based on which the required correction to each geometrical shape is calculated and applied. The lithography model consists of a) an optical model and b) other process effects including chemical, etching, and other factors. An optical model typically operates within a finite range called a proximity range. When the optical image is simulated for a location, commonly referred to as an evaluation point, only layout geometries within a radius of the proximity range centered around the evaluation point are considered, and those geometries outside of the range are ignored. A calibrated lithography model incorporates the optical model and the other process effects. To obtain a calibrated model, test masks are illuminated, wafer images are formed, and measurements are made, followed by data fitting. The lithography model is independent of physical layout.

The model-based OPC process typically involves a step referred to as dissection, where polygon edges are broken into edge segments which can be moved individually to correct each segment. Evaluation points are specified on the segments where the models are evaluated to calculate certain wafer characteristics, such as edge displacement, as illustrated in FIG. 1(c). The required edge movement is calculated on-the-fly so that the simulated edge displacements are minimized. Due to the use of a model and a correction algorithm, the correction does not require correction rules a priori, and is usually more accurate than one corrected by a rule-based approach. On the other hand, due to finer granularity of the correction, the resulting corrected layout by a model-based approach is typically more complex than that by a rule-based approach. Accordingly, full model-based OPC is generally used for critical layers of designs of 0.18 µm or smaller.

Following the OPC step, the data undergoes a mask data preparation (MDP) step where the data will be fractured, the result of which is used to write masks. Two main writing approaches are used today for mask manufacturing. For the first approach referred to as "raster-scan", an electron or optical beam is scanned across the mask and turned on where the mask should be exposed. For the second approach referred to as "vector-scan", a shaped e-beam is exposed at certain coordinates representing the data on the mask where the mask should be exposed. The shaped beam exposure tools usually require the data to only contain a certain set of angles. Typically, these angles are 45-degree, 90-degree, and 135-degree angles because of the restriction of the shapes that can be produced by the exposure tool. In this write approach, an MDP step is fracturing which involves taking complex shaped polygons and splitting them up into smaller primitives, typically trapezoids, which can be written by the mask writer. FIG. 2 illustrates examples of fracturing polygons into combinations of rectangles. The total number of primitives after fracturing for an IC layout is called "shot count", or "figure count". In shaped beam exposure tools, a significant portion of the total mask write time is directly proportional to the shot count. Longer mask write time means longer turn-around time, longer usage and wear of the exposure tools, and, hence, higher mask cost. Consequently, from the mask cost perspective, the fewer the shot count, the better. On the other hand, OPC typically introduces more complexity to the layout geometries which leads to dramatic shot count increases. In FIG. 2, for example, the original polygon 1100, with six vertices, can be fractured into two rectangles 1101 and 1102. After OPC, the resulting polygon 1200, which has 28 vertices, is fractured into 12 rectangles 1201 through 1212, a six-fold increase. Moreover, two slivers 1203 and 1205 are also created. These small slivers lead to exposure dose inaccuracies when the mask is exposed, which in turn results in dimension inaccuracies. If a simpler OPC can be applied without significantly compromising accuracy, then the shot count can be reduced and slivers can be removed. Again referring to FIG. 2, if the OPC can be simplified such that the small correction jogs 1001, 1002, and 1003 can be removed, then the resulting OPC output 1300, which contains 22 vertices, is fractured into 9 rectangles, a 25% savings in shot count, without producing slivers.

Part of the reason that rule-based OPC is more attractive than model-based OPC is that rule-based OPC typically creates less complex polygons than model-based OPC, which leads to lower shot counts, and, consequently, lower mask cost. However, even with rule-based OPC, some environmental configurations can still lead to OPC output that is less fracture-friendly. FIG. 2 shows a polygon 1400 with three neighboring features 1410, 1411, and 1412. A typical rule-based OPC using width-space formulae will create the following OPC features: hammerhead 1401, outer-serifs 1402, 1403, and 1404, inner-serif 1405, and biases 1406, 1407, 1408, and 1409. The different biases 1406 and 1407 are due to a spacing change caused by a geometry 1410, whereas the different biases 1408 and 1409 are due to a spacing change caused by a geometry 1411. Moreover, the existence of a geometry 1412 causes the serif 1404 to be different from serifs 1402 and 1403. This OPC result leads to a fracturing result of 11 rectangles 1501-1511, as shown in FIG. 2. A sliver 1503 is created as the result of misalignment between the bias jump from 1406 to 1407 and that from 1408 to 1409.

This fracture-unfriendly rule-based OPC is due to the strict application of a "best" correction or bias amount in accordance with the correction rule that would render the most accurate result, which inevitably introduces correction jogs when neighboring environment changes are present. Current techniques for further simplifying the OPC output involve a smoothing step, where non-smooth corrections consist of multiple correction jogs within some tolerance band, as shown in FIG. 3(a), are flattened to be free of jogs, as shown in FIG. 3(b). This technique is ad hoc, as it does not provide ways to control the accuracy of the correction. In fact, it is possible that after such an alteration of the OPC output, the correction accuracy is also severely impacted. What is needed is a method of specifying correction rules and applying these rules in rule-based OPC that is more fracture-friendly and generates simpler OPC output without significantly compromising accuracy.

It is to this end that the present invention is directed. The various embodiments of the present invention provide many advantages over conventional IC design methods and systems.

SUMMARY OF THE INVENTION

One embodiment of an optical proximity correction (OPC) based IC design system and method in accordance with the present invention provides many advantages over conventional design systems and techniques, which make the IC design system and method for providing OPC in accordance with the present invention more useful to semiconductor manufacturers. In accordance with the various embodiments of the present invention, a variable bias rule is introduced in which rules are specified in terms of varying bias ranges or a set of discrete bias values, for example, if the biases are required to be on a certain grid that yield acceptable results. This category of rules provides more degrees of freedom in actual application so that the rule-based OPC tool can intelligently select the proper valid rule that minimizes the OPC complexity.

Accordingly, one embodiment in accordance with the present invention provides an IC design system and method for creating and applying variable bias rules in rule-based OPC for reduced OPC complexity. In accordance with the present invention, a system is provided to apply rule-based OPC where each rule is described by ranges of dependent variables and a corresponding range of bias values, and the range is a set of all valid bias values, each causing the corrected features to be within a prespecified tolerance. Additionally, a method is provided for applying rule-based OPC where each rule is described by ranges of dependent variables and a corresponding set of valid bias values, each causing the corrected features to meet the required performance objective, where bias values are preferably selected from within the range or set of values so as to minimize the number of extra jogs created.

The foregoing and other objects, features, and advantages of the present invention will become more readily apparent from the following detailed description of various embodiments, which proceeds with reference to the accompanying drawing.

BRIEF DESCRIPTION OF THE DRAWING

The various embodiments of the present invention will be described in conjunction with the accompanying figures of the drawing to facilitate an understanding of the present invention. In the figures, like reference numerals refer to like elements. In the drawing:

FIGS. 1(a) through 1(g), illustrates the pattern distortion from the lithography process and application of optical proximity correction (OPC);

FIGS. 3(a) and 3(b), illustrates simplifying the OPC output in which non-smooth corrections consisting of multiple correction jogs within some tolerance band are flattened to be free of jogs;

FIGS. 5(a) and 5(b), shows an example that compares multiple-valued rules in accordance with the various embodiments of the present invention and conventional single-valued rules and the possible outputs when the rules are applied with rule-based OPC in accordance with one embodiment of the present invention;

FIGS. 8(a) through 8(c), illustrates another example in which completely smooth output cannot be obtained, but an output that minimizes fracture count is possible;

FIGS. 10(a) through 10(i), illustrates handling small exceptions when matching correction rule conditions or applying correction rules in order to reduce correction complexity.

DETAILED DESCRIPTION OF THE PREFERRED EMBODIMENTS

The present invention is particularly applicable to a computer-implemented software-based IC design system for generating an IC design using rule-based optical proximity correction (OPC) to correct an IC design layout, and it is in this context that the various embodiments of the present invention will be described. It will be appreciated, however, that the IC design system and method for providing rule-based OPC for reduced complexity in accordance with the various embodiments of the present invention have greater utility, since they may be implemented in hardware or may incorporate other modules or functionality not described herein.

Figure 1:
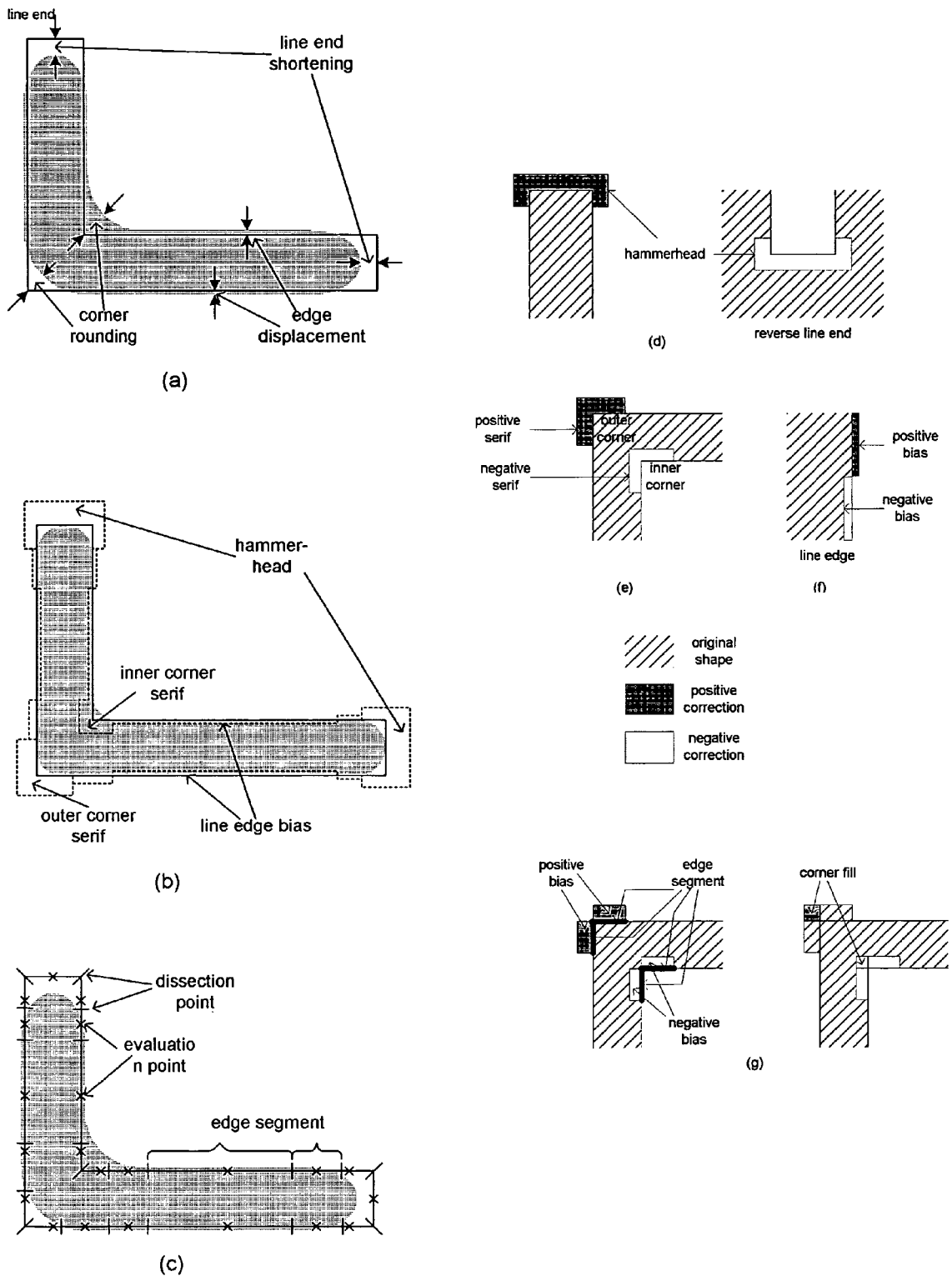
FIG. 1, comprising
Figure 2:
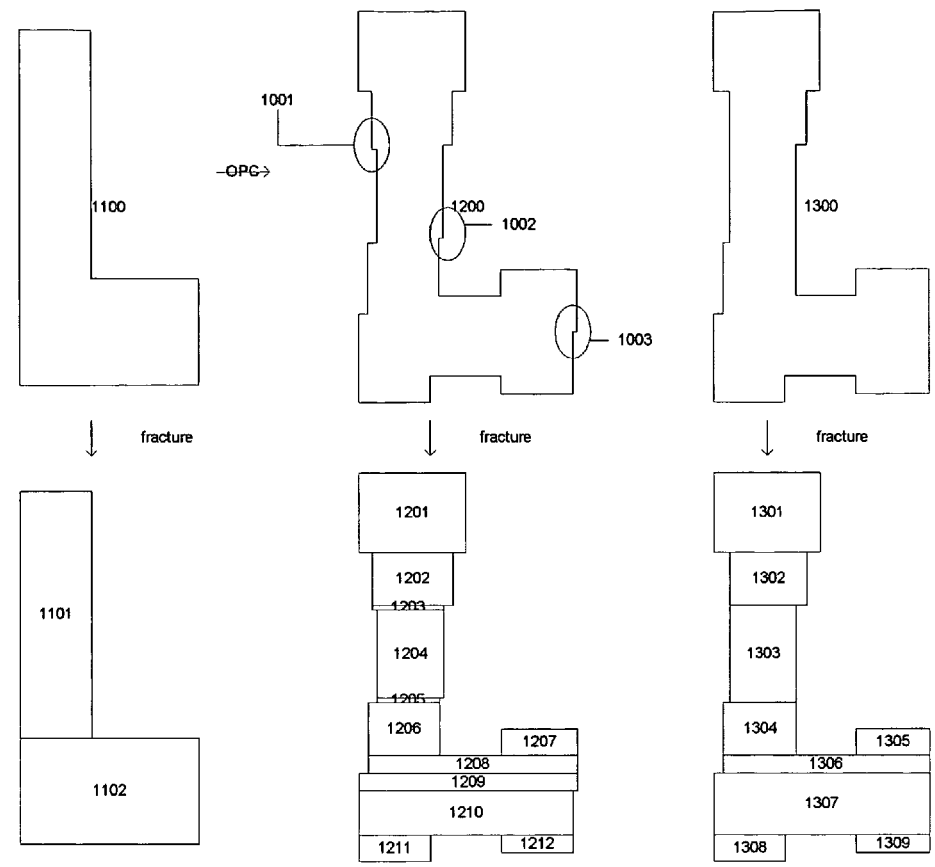
FIG. 2 illustrates examples of fracturing polygons into combinations of rectangles, and the increase of figure count and introduction of slivers by applying OPC to a simple geometry.
Figure 2:
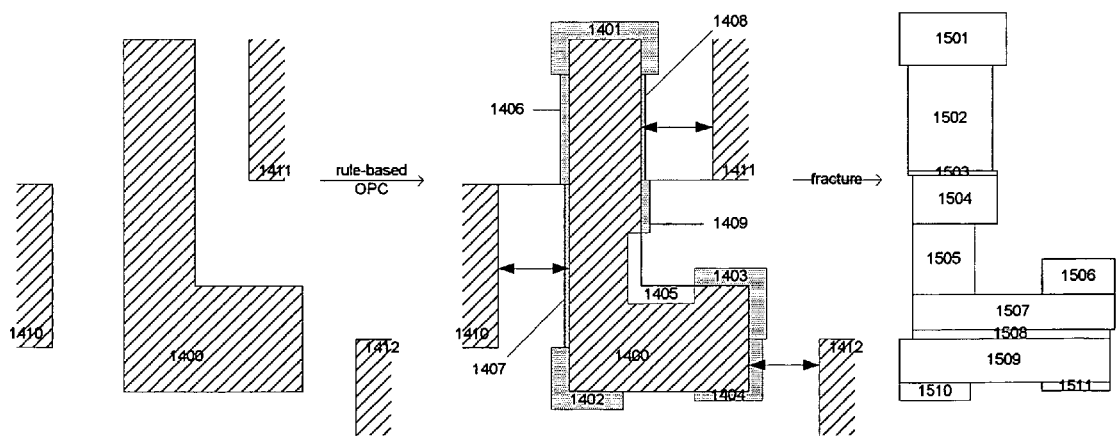
Figure 3:
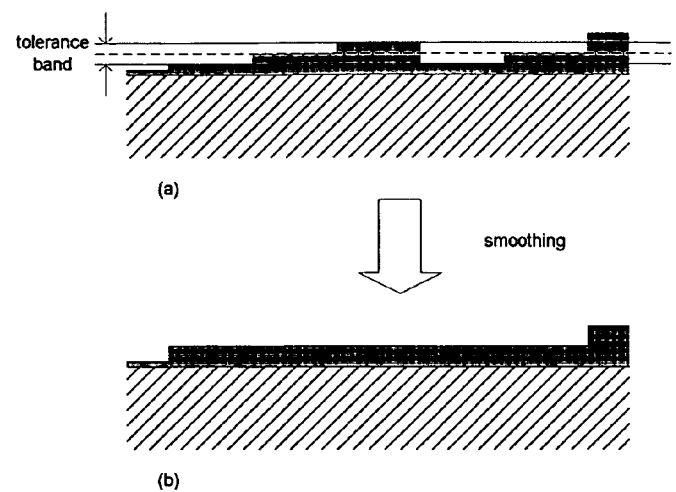
FIG. 3, comprising
Figure 4:
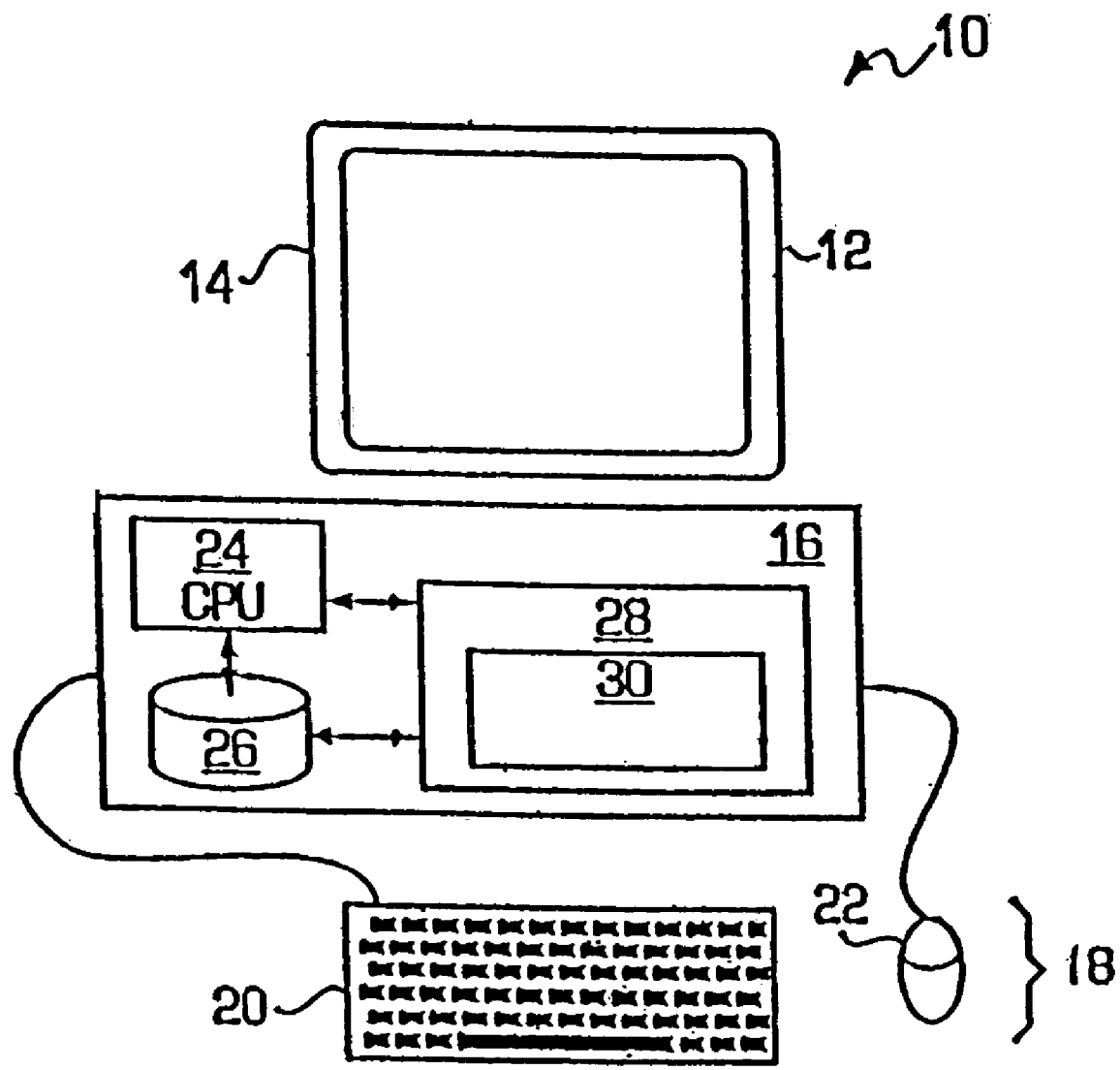
FIG. 4 is a block diagram illustrating an example of an IC design system for providing rule-based optical proximity correction (OPC) for reduced complexity in accordance with one embodiment of the present invention.

FIG. 4 is a block diagram illustrating an example of an IC design system 10 for providing rule-based OPC for reduced complexity in accordance with one embodiment of the present invention implemented on a personal computer 12. In particular, the personal computer 12 may include a display unit 14, which may be a cathode ray tube (CRT), a liquid crystal display, or the like; a processing unit 16; and one or more input/output devices 18 that permit a user to interact with the software application being executed by the personal computer. In the illustrated example, the input/output devices 18 may include a keyboard 20 and a mouse 22, but may also include other peripheral devices, for example, printers, scanners, and the like. The processing unit 16 may further include a central processing unit (CPU) 24, a persistent storage device 26, such as a hard disk, a tape drive, an optical disk system, a removable disk system, or the like, and a memory 28. The CPU 24 may control the persistent storage device 26 and memory 28. Typically, a software application may be permanently stored in the persistent storage device 26 and then may be loaded into the memory 28 when the software application is to be executed by the CPU 24. In the example shown, the memory 28 may contain an IC design tool 30 for providing rule-based OPC. The IC design tool 30 may be implemented as one or more software modules that are executed by the CPU 24.

In accordance with the present invention, the IC design system 10 for providing rule-based OPC for reduced complexity may also be implemented using hardware and may be implemented on different types of computer systems, such as client/server systems, Web servers, mainframe computers, workstations, and the like. Now, more details of an exemplary implementation of the IC design system 10 in software will be described.

One embodiment of the present invention provides rule-based OPC for an IC design tape-out. For example, the IC design tape-out may be a GDS or OASIS file or a file having another format.

Various embodiments of the present invention provide a method of specifying correction rules not in terms of deterministic correction or bias values, but rather in terms of a set of valid correction or bias values from which the actual rule-based OPC processor can select. In one embodiment of the present invention, the rule-based OPC processor selects correction or bias values from the set of available values and applies the correction so as to minimize the complexity of the OPC output. In particular, the rule-based OPC processor applies corrections so as to minimize the number of vertices in the OPC output.

Correction rules can be represented mathematically as $R=f(C_1, C_2, \ldots)$, where $C_1, C_2, \ldots$ are rule "conditions". Possible conditions are pattern shapes (line ends or reverse line ends, inside or outside corners, jogs, etc.), pattern dimensions (width, spacing, height, etc.), circuit properties (gate, endcap, contact enclosure, etc.), and more complex characterization which combines any and all of the above. The rule R itself dictates an action to be performed on the pattern, such as moving an edge toward the outside by a certain amount (bias), adding a serif of a certain size (a serif contains two bias values), adding a hammerhead of a certain size (a hammerhead contains three bias values), or more complex actions that combine one or more of these actions (e.g., bias up the poly lines and bias down the diffusion by the same amount). The complete rule set may contain complex rules which have different formulations (different $c_i$ specifications, different form of f, and different R). The complete rule set can be easily represented in tabular form, with $c_i$'s being the columns of "keys", and R being the column of values (as in a database).

A more concise and commonly used form of rules used in rule-based OPC is one in which the form of a correction rule can be represented as a function of multiple variables, $(b_1, b_2, \ldots, c_1, c_2, \ldots) = f(g_1, g_2, \ldots, d_1, d_2, \ldots)$, where $g_i$ are types of shapes such as line edge, line end, corners, gates, contact enclosures, or patterns identified by complex Boolean or geometrical operations across multiple design layers; and $d_i$ are dimensions such as width, spacing, height, enclosure margin, or functions of multiple measured dimensions through a complex formula. The output of the rule is a bias correction quantity $b_i$, which provides correction to be applied to such patterns, together with additional parameters $c_i$, which identify precisely the portion of the shape to which the bias is to be applied. Typically, the shapes are pre-selected (e.g., an edge or a portion of the edge) such that no further breakdown of the shape is allowed and the rule function simplifies to $(b_1, b_2, \ldots) = f(g_1, g_2, \ldots, d_1, d_2, \ldots)$. If the shape consists of a single edge segment, then the rule function simplifies to $b=f(g_1, g_2, \ldots, d_1, d_2, \ldots)$, where b is the bias to be applied to the edge segment. This is a generic representation, since as explained in the prior art section, other more complex shapes can be broken down into a collection of single edge segments. Represented in table format, each rule contains "key" columns consisting of $g_1, g_2, \ldots, d_1, d_2, \ldots$, and the "value" column includes b. In other word, each rule is a mapping between the values of the dependent variables and a bias value. In a most popular form of classical rule table, the dependent variables are typically partitioned into intervals. The smaller the interval, the more precise the rules are, but the larger the rule table is. An example of one such rule table is as follows:

| Width (w) | Spacing (s) | Bias (b) |
|---|---|---|
| 200 ≦ w < 250 | 400 ≦ s < 500 | 5 |
| 250 ≦ w < 300 | 400 ≦ s < 500 | 3 |
| 250 ≦ w < 300 | 600 ≦ s < 600 | 1 |
| . | . | . |
| . | . | . |
| . | . | . |

Complete rules to be applied to an IC layout may consist of a multitude of sets of rules, with a different condition specified for each set of the rules. For example, the rules for correcting poly layers may consist of three sets of rules, one applies to transistor gates (a condition for identifying the applicable poly patterns), another applies to poly lines that are at least a certain distance away from diffusion (another condition for identifying the applicable poly patterns), and the remainder of the poly patterns (a third condition for identifying the applicable poly patterns). Then, different patterns will be identified using the conditions, and the corresponding rule set will be used when applying rule-based OPC for these patterns.

Conventional rule-based OPC solutions are based on one deterministic action per matching condition and typically do not consider the complexity of the OPC output. For example, in rules where the correction is a bias amount, there is a single bias value associated with each correction rule, as demonstrated in the previous example (the rule table above). In the case of tabular format, each rule entry has a single correction value. This can lead to jogs in the corrected output when an edge experiences width or space transition, as shown in FIG. 5(a).

In accordance with the present invention, at least one correction rule is characterized by at least two, but possibly more, correction actions for a set of condition specifications. In the more generic forms, such multi-valued rules may be represented by $(\{R\}) = f(C_1, C_2, \ldots)$, where $\{R\}$ is the set of all possible corrections. For example, $\{R\} = \{R_1, R_2, \ldots\}$ means that the set of correction actions is a collection of distinct correction actions $R_1, R_2, \ldots$. As another example, $\{R\} = [bmin, bmax]$, in which case the correction action is a bias amount that can have an arbitrary value from bmin to bmax. During the actual correction, one action is selected in order to achieve a preset objective, typically, reduced mask complexity.

Figure 6:
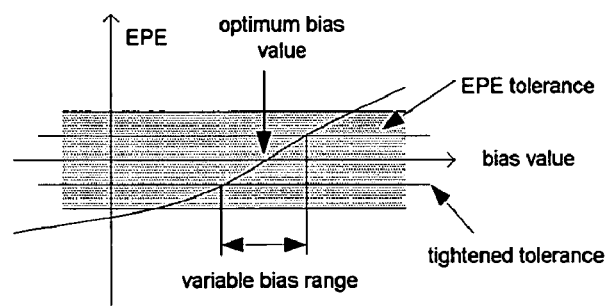
FIG. 6 illustrates a range of values of bias that can lead to an edge placement error (EPE) that is within an optionally tightened tolerance.

Determination of a rule may be either simulation-based or manual. The simulation-based approach is an automatic way for obtaining biases. The co-pending U.S. patent application entitled MODEL-BASED PATTERN CHARACTERIZATION TO GENERATE RULES FOR RULE-MODEL-BASED HYBRID OPTICAL PROXIMITY CORRECTION, application Ser. No. 11/221,528 filed on Sep. 8, 2005, the disclosure of which is hereby incorporated herein in its entirety by this reference, describes a systematic way of generating rules using simulations. For example, this approach simulates the pattern with the specified width and spacing and determines a bias value that yields the smallest edge placement error (EPE). If one specifies an EPE tolerance range, which can be optionally further tightened as explained in that patent application, then as illustrated in FIG. 6, there is a range of values of bias that can lead to an EPE that is within the optionally tightened tolerance. This range is referred to as the "variable bias range". In principle, any bias value within this range can be selected by the rule-based OPC processor to be applied. Practically, there may be additional constraints (such as a correction grid) that limit this range to a few distinct values (for example, all integer values within this range). Within this variable bias range, there is one value that is considered "optimal". Such optimal bias is usually based on metrics such as EPE (where the optimal bias would render the smallest absolute value of the EPE, as shown in FIG. 6), image slope, mask error enhancement factor (MEEF), etc. The conventional rule-based OPC is based on a single bias value which is typically one such optimal bias. The embodiments of the present invention introduce a variable bias rule format that allows a selection of a bias value within the variable bias range or from a collection of multiple bias values. This extra freedom for selecting the rule-based OPC may be applied so as to minimize the complexity of the OPC result.

Figure 5:
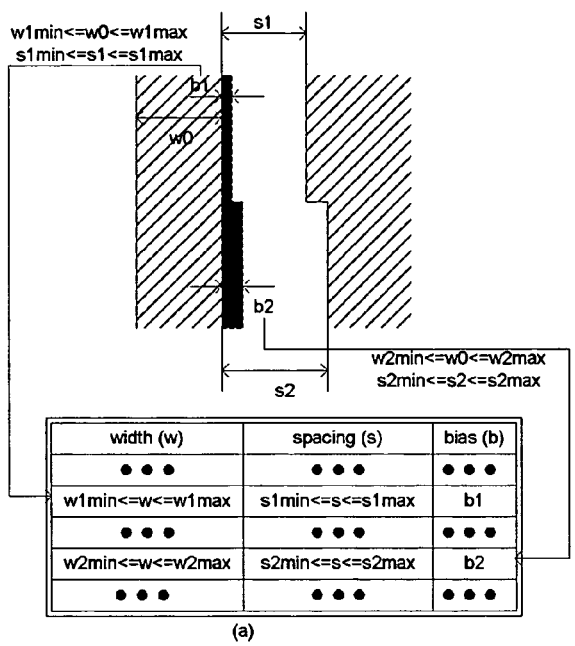
FIG. 5, comprising
Figure 5:
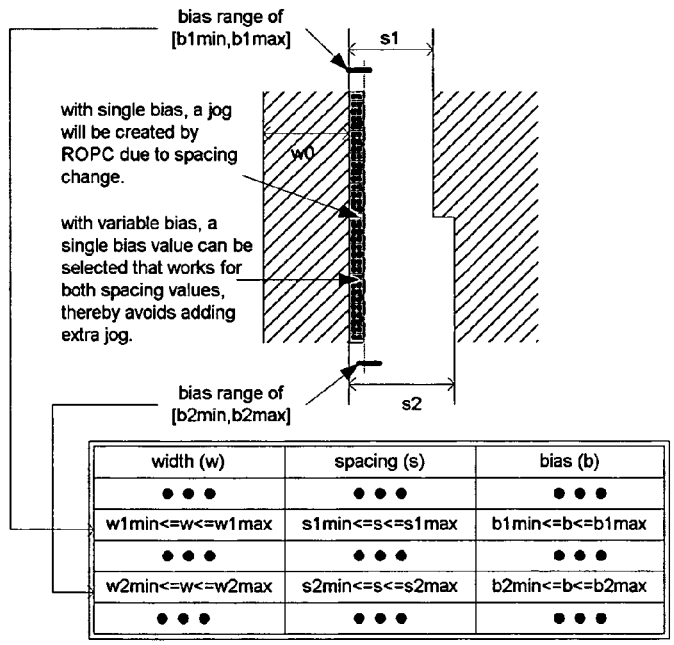

FIG. 5 shows an example that compares the use of the new multiple-valued rules and the conventional single-valued rules when applying rule-based OPC. A pattern with width w0 has varying neighboring spacing s1 and s2. Suppose s1 and s2 are sufficiently far apart that they fall into different spacing intervals in the rule table. In applying the single-valued rule in FIG. 5(a), the bias values corresponding to (w0,s1) and (w0,s2) are different, resulting in a jog at the spacing transition location after the application of rule-based OPC. This introduces two new vertices in the output. However, even when s1 and s2 are different, the corresponding variable bias range for (w0,s1) and (w0,s2) may overlap, as illustrated in FIG. 5(b). Consequently, the rule-based OPC in accordance with one embodiment of the present invention selects a single bias value that falls into both bias ranges. This bias value will be valid for both situations. The result is a single bias value without introducing any new vertices. This results in simplified OPC.

Figure 7:
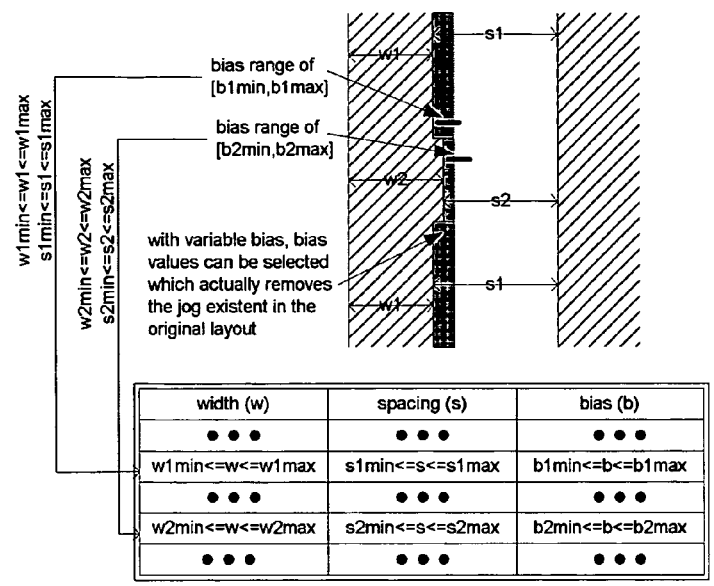
FIG. 7 shows an example where jogs existing in a pre-OPC original geometry can even be removed after applying rule-based OPC in accordance with the various embodiments of the present invention.

FIG. 7 shows an example where jogs existing in a pre-OPC original geometry can even be removed after applying the rule-based OPC in accordance with one embodiment of the present invention. As shown in FIG. 7, the jogs cause transitions in both pattern width and spacing, resulting in two width/spacing pairs (w1,s1) and (w2,s2), which corresponds to two different rules in the rule table. A bias b1 can be selected from [b1min,b1max] and a bias b2 can be selected from [b2min,b2max], such that the difference between b1 and b2 is equal to the size of the jog, as shown in FIG. 7, so that with the application of the biases, the result is jog free. The result is an OPC output that actually removes four original vertices constituting the two jogs.

Figure 8:
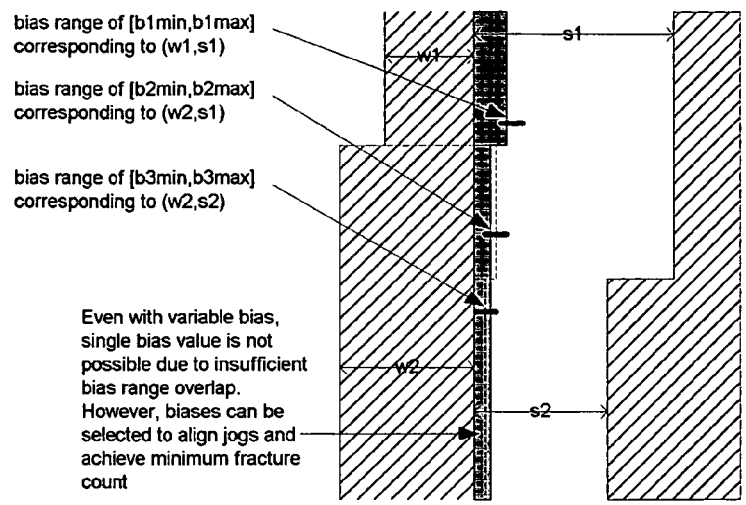
FIG. 8, comprising
Figure 8:
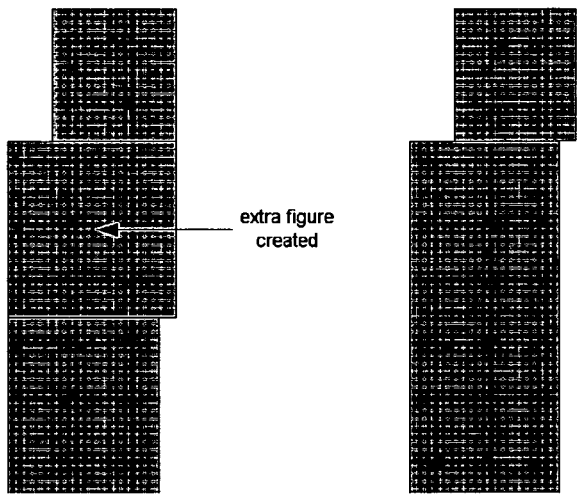

FIG. 8 is another example in which completely smooth output cannot be obtained, but an output that minimizes figure count is possible. The original feature has a width transition from w1 to w2 and a spacing transition from s1 to s2. This results in three rule entries corresponding to (w1,s1), (w2,s1), (w2,s2), with bias ranges of [b1min,b1max], [b2min,b2max], and [b3min,b3max], respectively. If the three bias ranges overlap, such that there exists a single bias value that falls into all three ranges, then such bias can be selected and applied that avoids creating jogs. However, in this example, variable bias ranges [b1min,b1max] and [b3min,b3max] do not overlap, but the bias range [b2min,b2max] overlaps with both. Then, considering the width change caused by the opposite edge, the rule-based OPC in accordance with one embodiment of the present invention selects a single bias value from the intersection of [b2min,b2max] and [b3min,b3max], and an arbitrary bias from [b3min,b3max] to be applied to the three edges. A jog will be created in the output, but the jog is aligned with the jog on the opposite side, as shown in FIG. 8(c), and after fracturing, no extra figure is created. If three different bias values were used for the three width and spacing conditions, as in conventional rule-based OPC (shown in the dashed lines in FIG. 8(a)), then an extra figure would be created after fracturing, as shown in FIG. 8(b).

Figure 9:
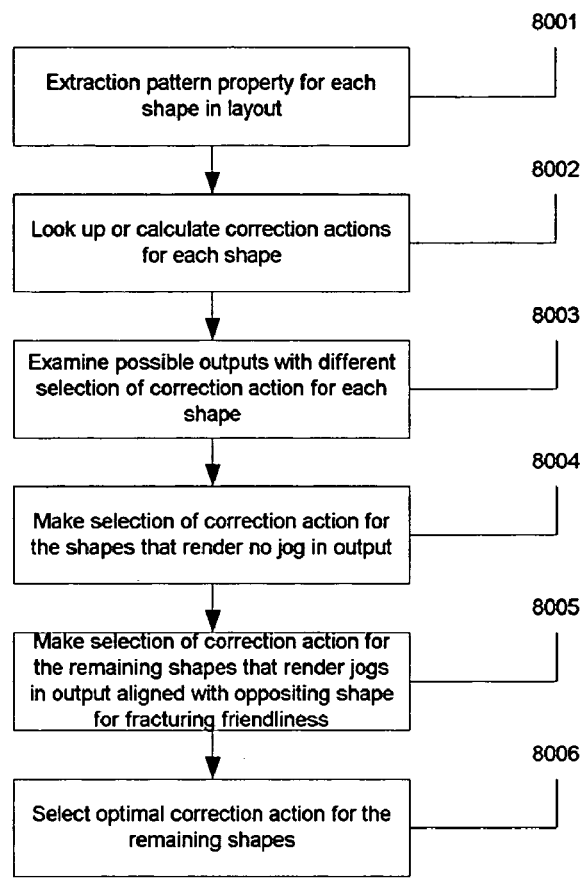
FIG. 9 is a flow diagram for variable bias rule determination in accordance with one embodiment of the rule-based OPC method of the present invention.

FIG. 9 is flow diagram for applying rule-based OPC from a variable rule set that minimizes the OPC output complexity. The key is, instead of adopting a rule table in which each rule consists of a single correction action that optimizes the performance objective, e.g., minimizing EPE, the rule-based OPC uses a variable rule set in which each rule consists of several correction actions that the rule-based OPC can select from, that all achieve a performance objective within tolerance, and selects the correction action that results in the simplest OPC output. As shown in FIG. 9, in a first step 8001, pattern properties are extracted for each shape in the layout (such as width, spacing, pattern type, etc.). Then, the correction actions are looked up in the rule table or calculated according to the rule formula in a step 8002. With correction actions determined for each shape, some or all shapes will have more than one correction action. In a step 8003, different possible outputs with combinations of different selections of correction actions are examined. First, in a step 8004, the correction action is determined for those shapes that, after applying the rules, will create no new jogs or remove jogs in the original layout. For the remaining shapes, correction jogs will be unavoidable no matter how the correction actions are selected. In an optional next step 8005, the correction actions are determined for those remaining shapes in which, after applying the rules, the resulting jogs are aligned with the vertices of the opposing shape (which avoid creating an extra figure during fracturing). For the remainder of the shapes, the OPC output will not be simplified by selection of correction actions, and, hence, the optimal correction action will be applied to those shapes, as in conventional rule-based OPC. For example, the correction action that leads to the smallest absolute value of EPE will be applied. As shown in FIG. 9, the newly introduced steps 8003-8005 as compared to conventional rule-based OPC take advantage of the selection of the correction rules that generate less complex OPC output.

One contemplated modification of this method is reducing the variable bias rules into single bias rules through rule-merging with the goal of reducing correction variations and avoiding jog creation. For example, suppose there are four rules from a rule set shown in tabular form as:

| Width range | Spacing range | Height range | Bias range |
|---|---|---|---|
| 300–350 | 400–450 | 800–900 | 5–10 |
| 350–400 | 400–500 | 800–900 | 2–6 |
| 300–350 | 450–500 | 800–900 | 6–11 |
| 300–400 | 500–600 | 800–900 | 4–8 |

These four rules can be merged into a single rule as:

| Width range | Spacing range | Height range | Bias range |
|---|---|---|---|
| 300–400 | 400–600 | 800–900 | 6 |

This rule demonstrates that for any feature in the height range of 800-900 nm having a width variation within 300-400 nm and a spacing variation within 400-600 nm would lead to the same 6 nm bias. Hence, for features having a width or spacing transition within these ranges, no extra jog will be created after rule-based OPC.

Figure 10:
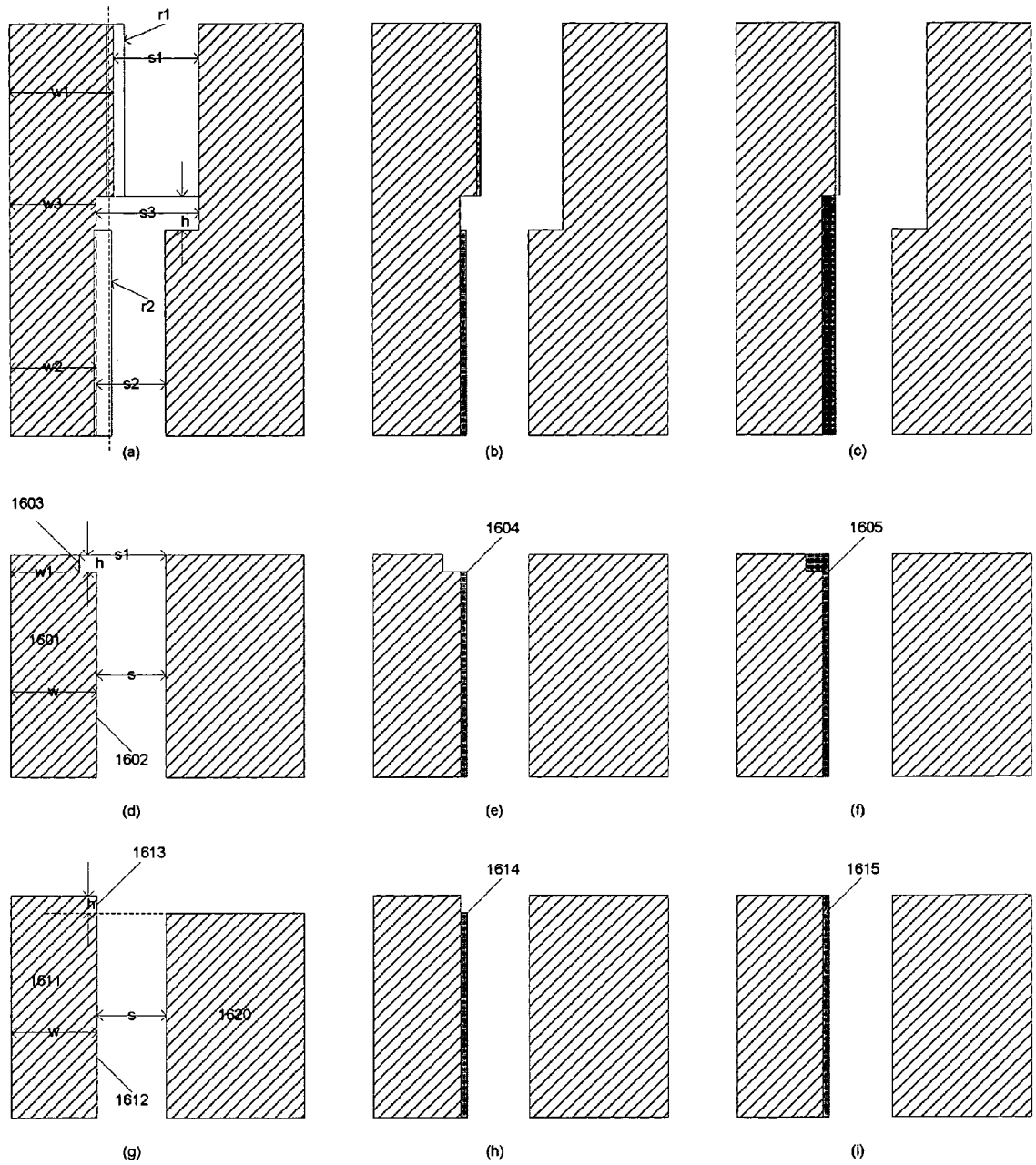
FIG. 10, comprising

Another embodiment of the present invention involves adding allowance of small exceptions when matching or applying correction rule conditions in order to reduce correction complexity. FIG. 10 shows several examples. FIG. 10(a) shows a pattern in which there are three width/spacing pairs measured: (w1,s1), (w2,s2), and (w3,s3), where (w1,s1) and (w2,s2) have associated rules r1 and r2, respectively (both are ranges as shown in dashed boxes). There are no rules associated with (w3,s3), which separates the two edges. If one applies OPC strictly according to the rules, then the result is a correction shown in FIG. 10(b), where one jog in the original shapes is replaced by two jogs in corrected shapes. However, when the part of the edges associated with (w3,s3) is small (i.e., h is shorter than a prespecified tolerance), then the rule-based OPC can ignore this small exception and extend the edge that matches r2 to include this small segment. In this case, the rule-based OPC can select corrections such that the jog in the original shape is removed, as shown in FIG. 10(c), because the bias ranges for r1 and r2 overlap, as shown in FIG. 10(a). FIG. 10(d) shows another example where the original geometry 1601 has a small jog 1603 along with an edge 1602. The edge 1602 has width w and spacing s that satisfies the condition of a rule which has a corresponding bias range [bmin,bmax]. The jog has a width w1 and spacing s1 which finds no matching rule in the rule table. Consequently, a rule-based OPC correction based on strict rule matching will select a bias amount from the range [bmin,bmax] and produce a correction 1604 shown in FIG. 10(e), where the original jog is still present and uncorrected. However, if the size of the jog h is small, the rule-based OPC can extend the correction to cover this jog, resulting in a correction 1605 shown in FIG. 10(f) that has a smooth output, with no jog. In yet another example shown in FIG. 10(g), the original feature 1611 has a width of w and no jog, but the neighboring feature 1620 leads to a spacing transition along the feature 1611 from s to infinite. The portion of the edge 1612 with width w and spacing s finds a matching rule with a bias range [bmin,bmax], whereas the remaining portion of the edge 1613 is of width w, spacing infinity, and a small size h, and finds no matching rule. Consequently, a rule-based OPC correction based on strict rule matching will select a bias amount from the range [bmin,bmax] and produce a correction 1614 shown in FIG. 10(h), which introduces a jog that is non-existent in the original feature. However, if the size of unmatched edge portion h is small, the rule-based OPC can extend the correction to cover this portion with the same bias amount, resulting in a correction 1615 shown in FIG. 10(i) that has a smooth output, with no jog.

So far in the selection of correction actions for each rule the rule-based OPC has focused on making the selections to minimize OPC output complexity. It does, however, not exclude the use of other objectives for rule-based OPC in making the selection, including those that are compatible with the traditional "optimal" correction action. For example, the rule-based OPC can select correction actions based on minimizing the absolute value of the EPE or CD error, maximizing the image slope or contrast, maximizing dose or defocus latitude, or minimizing sensitivity to aberration or mask error enhancement factor (MEEF). The rule-based OPC may also choose to adopt different objectives for different types of patterns, for example, minimizing EPE for transistor gates, maximizing image slope for small critical dimension features, and minimizing OPC output complexity for large critical dimension features.

While the foregoing description has been with reference to particular embodiments of the present invention, it will be appreciated by those skilled in the art that changes to these embodiments may be made without departing from the principles and spirit of the invention. Accordingly, the scope of the present invention can only be ascertained with reference to the appended claims.

What is claimed is:

1. A correction rule specification method in which the correction rule is used for rule-based optical proximity correction (OPC), comprising:

specifying at least one correction rule R for rule-based OPC which comprises of a set of conditions $C_1, C_2, \ldots$ represented mathematically as $R=f(C_1, C_2, \ldots)$, where $C_1, C_2, \ldots$ are conditions and f indicates that said at least one correction rule for rule-based OPC is dependent on said conditions, wherein said at least one correction rule for rule-based OPC has at least one correction action that has a range or set of correction values; and selecting, by using a computer, an optimal correction value from the range or set of correction values for a shape of an integrated circuit layout, that results in optimal OPC output for reduced complexity using rule-based OPC;

wherein the selecting includes determining the optimal correction value by determining a first correction value from the range or set of correction values that overlaps a second correction value of a second correction rule whereby the optimal correction value, when applied to the shape as rule-based OPC, would not introduce any new vertices in the shape; or wherein the selecting includes determining the optimal correction value by determining the first or a third correction value from the range or set of correction values if the range or set of correction values does not overlap the second correction value whereby the optimal correction value, when applied to the shape as rule-based OPC, would minimize figure count.

2. The method of claim 1 wherein the conditions are parameterized and specified in terms of a rule table.

3. The method of claim 1 wherein the at least one correction action is parameterized and specified in terms of the amount of edge movement.

4. The method of claim 3 wherein the at least one correction rule for rule-based OPC is specified in terms of the amount of edge movement that is given in a set of discrete numbers.

5. The method of claim 3 wherein the at least one correction rule for rule-based OPC is specified in terms of the amount of edge movement that is given by at least one continuous range.

6. The method of claim 3 wherein a correction action is specified by two parameters representing the amount of edge movement of the two edges of a corner such that the result of the correction after application of the correction rule is a serif.

7. The method of claim 6 wherein at least one amount of edge movement is given in a set of discrete numbers.

8. The method of claim 6 wherein at least one amount of edge movement is given in a set of continuous ranges.

9. The method of claim 3 wherein a correction action is specified by three parameters representing the amount of edge movement of the three edges of a line end such that the result of the correction after application of the correction rule for rule-based OPC is a hammerhead.

10. The method of claim 9 wherein at least one amount of edge movement is given in a set of discrete numbers.

11. The method of claim 9 wherein at least one amount of edge movement is given in a set of continuous ranges.

12. The method of claim 1 wherein the at least one correction rule for rule-based OPC is applied by rule-based OPC to an integrated circuit layout by selecting one correction rule from a set of correction rules.

13. The method of claim 12 wherein the selection of a correction rule for rule-based OPC is based on minimizing the complexity of the output.

14. The method of claim 13 wherein minimizing the complexity of the output comprises minimizing the number of vertices that can be created by avoiding creation of jogs when applying more than one correction rule for rule-based OPC on the same polygon edge.

15. The method of claim 13 wherein minimizing the complexity of the output comprises minimizing the number of vertices that can be created by removing jogs in the original layout geometries when applying one or more correction rules for rule-based OPC on multiple edges.

16. The method of claim 13 wherein minimizing the complexity of the output comprises aligning the vertices created on the edge with their opposite vertices which avoid creation of extra fracturing figures.

17. The method of claim 13 wherein minimizing the complexity of the output comprises allowing exceptions to correction rules for rule-based OPC and extending corrections for exception shapes by rule-based OPC which eliminate vertices that would otherwise be caused by exception shapes in the OPC output.

18. The method of claim 17 wherein the exception shape is a shape having a height or width not exceeding a prespecified threshold.

19. The method of claim 12 wherein the selection of a correction rule for rule-based OPC is based on obtaining the smallest absolute value of edge placement error (EPE) for the applicable edge.

20. The method of claim 12 wherein the selection of a correction rule for rule-based OPC is based on obtaining the largest absolute value of intensity slope for the applicable edge.

21. The method of claim 12 wherein the selection of a correction rule for rule-based OPC is based on obtaining the optimal focus latitude for the applicable edge.

22. The method of claim 12 wherein the selection of a correction rule for rule-based OPC is based on obtaining one of the group of performance metrics consisting of the smallest value of mask error enhancement factor (MEEF), smallest value of sensitivity to aberration, and the largest image contrast.

23. A rule-based optical proximity correction (OPC) system comprising instructions stored on or in a computer-readable storage medium and executed by a processor, the instructions comprising:

instructions for specifying at least one correction rule R for rule-based OPC consisting of a set of conditions $C_1$, $C_2$, ... represented mathematically as $R=f(C_1, C_2, ...)$, where $C_1, C_2, ...$ are conditions and f indicates that said at least one correction rule for rule-based OPC is dependent on said conditions, wherein said at least one correction rule for rule-based OPC has at least one correction action that has a range or set of correction values; and instructions for selecting an optimal correction value from the range or set of correction values for a shape of an integrated circuit layout, that results in optimal OPC output for reduced complexity using rule-based OPC;

wherein the instructions for selecting includes instructions for determining the optimal correction value by determining a first correction value from the range or set of correction values that overlaps a second correction value of a second correction rule whereby the optimal correction value, when applied to the shape as rule-based OPC, would not introduce any new vertices in the shape; or wherein the instructions for selecting include instructions for determining the optimal correction value by determining the first or a third correction value from the range or set of correction values if the range or set of correction values does not overlap the second correction value whereby the optimal correction value, when applied to the shape as rule-based OPC, would minimize figure count.

24. The system of claim 23 wherein the conditions are parameterized and specified in terms of a rule table.

25. The system of claim 23 wherein the at least one correction action is parameterized and specified in terms of the amount of edge movement.

26. The system of claim 25 wherein the correction rule for rule-based OPC is specified in terms of the amount of edge movement that is given in a set of discrete numbers.

27. The system of claim 25 wherein the correction rule for rule-based OPC is specified in terms of the amount of edge movement that is given by at least one continuous range.

28. The system of claim 25 wherein a correction action is specified by two parameters representing the amount of edge movement of the two edges of a corner such that the result of the correction after application of the correction rule for rule-based OPC is a serif.

29. The system of claim 28 wherein the amount of edge movement is given in a set of discrete numbers.

30. The system of claim 28 wherein the amount of edge movement is given in a set of continuous ranges.

31. The system of claim 25 wherein a correction action is specified by three parameters representing the amount of edge movement of the three edges of a line end such that the result of the correction after application of the correction rule for rule-based OPC is a hammerhead.

32. The system of claim 31 wherein the amount of edge movement is given in a set of discrete numbers.

33. The system of claim 31 wherein the amount of edge movement is given in a set of continuous ranges.

34. The system of claim 23, further comprising instructions for receiving an integrated circuit layout wherein rule-based OPC correction is applied to the integrated circuit layout.

35. The system of claim 34 wherein the selection of a correction rule for rule-based OPC is based on minimizing the complexity of the output.

36. The system of claim 35 wherein minimizing the complexity of the output comprises minimizing the number of vertices that can be created by avoiding creation of jogs when applying more than one correction rule for rule-based OPC on the same polygon edge.

37. The system of claim 35 wherein minimizing the complexity of the output comprises minimizing the number of vertices that can be created by removing jogs in the original layout geometries when applying one or more correction rules for rule-based OPC on multiple edges.

38. The system of claim 35 wherein minimizing the complexity of the output comprises aligning the vertices created on the edge with their opposite vertices which avoid creation of extra fracturing figures.

39. The system of claim 35 wherein minimizing the complexity of the output comprises allowing exceptions to correction rules for rule-based OPC and extending corrections for exception shapes by rule-based OPC which eliminate vertices that would otherwise be caused by exception shapes in the OPC output.

40. The system of claim 39 wherein the exception shape is a shape having a height or width not exceeding a prespecified threshold.

41. The system of claim 34 wherein the selection of a correction action is based on obtaining the smallest absolute value edge placement error (EPE) for the applicable edge.

42. The system of claim 34 wherein the selection of a correction action is based on obtaining the largest absolute value of intensity slope for the applicable edge.

43. The system of claim 34 wherein the selection of a correction action is based on obtaining the optimal focus latitude for the applicable edge.

44. The system of claim 34 wherein the selection of a correction action is based on obtaining one of the group of optimum performance metrics consisting of the smallest value of mask error enhancement factor (MEEF), smallest value of sensitivity to aberration, and the largest image contrast.

* * * * *